Patented Jan. 1, 1946

2,392,180

UNITED STATES PATENT OFFICE 2,392,180

AZO DERIVATIVES OF AMINO DIPHENYL-AMINES

Robert P. Parker, Somerville, and John J. Denton, Bound Brook, N. J., assignors to American Cyanamid Company, New York, N. Y., a corporation of Maine No Drawing. Application July 3, 1944, Serial No. 543,431

6 Claims. (Cl. 260—177)

This invention relates to a new series of azo dyestuffs derived from glycol derivatives having the following formula:

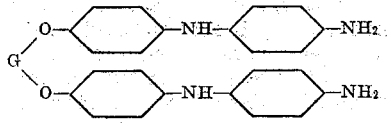

in which G is the residue of a glycol having not less than two and not more than four carbon atoms.

In the past there has been a demand for ice-colors having strong blue to violet shades. Many attempts have been made to produce such dyestuffs and in many cases the fastness properties such as fastness to light, heat and washing have left much to be desired. It is an advantage of the present invention that ice-colors of strong blue to violet shades can be produced which as pigments or dyes exhibit superior fastness properties such as fastness to light, heat and washing.

The present invention is not limited to ice-colors as the glycol derivatives may be diazotized and coupled with other coupling components to give azo dyes of different shades, and dyes which are soluble in water and capable of dyeing basic nitrogenous fibers. The ice-colors producible by the present invention are particularly outstanding in their properties and therefore constitute the preferred embodiment of the present invention.

The present invention is, of course, not concerned with the method by which the glycol derivatives are produced. These compounds and a process of making them form the subject matter of our copending application Serial No. 543,428 filed July 3, 1944. In general, they may be prepared by reacting 4'-hydroxy-4-nitro diphenylamine or its 2-sulfonic acid derivative with an ester of the glycol desired in strongly alkaline medium followed by the reduction of the nitro groups. If the reduction takes place in the acid medium, salts of the base with the acid are obtained and these salts are usable in producing the azo dyestuffs of the present invention.

The dyestuffs of the present invention may be made from derivatives of any of the glycols having not less than two and not more than four carbon atoms such as ethylene, propylene, 2-methyl propylene, 1-methyl propylene, 1-ethylethylene, butylene glycols, diethylene glycol, thiodiglycol, and the sulfoxides and the sulfones derived therefrom. The shade does not differ very greatly with the different glycols and because ethylene glycol esters are considerably cheaper and more readily available the azo dyestuffs derived from them are preferred.

For the process of diazotization, higher temperature, greater concentration of the base and higher mineral and nitrous acid concentrations tend to produce N-nitroso derivatives of the diazonium salts. It is, therefore, in general preferable to use lower temperature, lower acid concentration and slower addition of nitrite in order to prevent production of the nitroso derivative as this product gives duller and less desirable shades on coupling. It is possible to hydrolyze the nitroso dyestuffs in dilute solution by heating with alkalis such as soda ash. If desired, reducing agents such as sodium sulfide or sodium bisulfite and the like may be included in the hydrolysis step in order to destroy nitric oxides as they are liberated.

In their diazotized form, the bases may be coupled either with or without a substrate, to yield dyestuffs or pigments of great value because of their strength, variety of shade and fastness properties. In particular, however, the bases of the present invention are important for the production of fast blue prints or dyeings upon cellulosic materials. These are produced in general, by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases.

Solutions of the diazotized bases used in the present invention may also be treated with inorganic alkali metal salts or alkaline-earth metal salts, or with mixtures of these salts together with appropriate inorganic metal salts whereupon the diazonium salts or metal salt complexes of the diazonium salts are precipitated. These may be separated, dried, stored or blended with inorganic salts such for example as with sodium or potassium chlorides, sulfates, magnesium sulfate, aluminum sulfate and the like; the latter preferably being used in their partially dehydrated forms. Such products may be readily dissolved in water to yield solutions from which cellulosic materials which have previously been impregnated in alkaline grounding baths with appropriate ice-color coupling components may be suitably pad dyed, or the solutions may be appropriately thickened and printed upon the prepared cellulosic fabrics.

The bases used in the present invention may also be converted into diazosulfonates which may be isolated from solution, dried, stored or they may be blended in the dry state with appropriate ice-color coupling components and oxidizing agents. Such blends may be incorporated into a printing paste, printed upon vegetable fibres and the pigment developed by treatment with steam.

Substantially any of the ice-color coupling components are generally useful for production of insoluble, developed dyes, and enable the production of a variety of colors from yellow to blue. However, for the present purposes, the use of arylids of 2-hydroxy-3-naphthoic acid is preferable. These produce, when coupled with the diazotized bases used in the present invention, the most desirable blue to violet shades.

However, the invention is not necessarily so limited. Among other ice-color coupling components which produce useful products may be listed by way of example such compounds as beta-naphthol, 8-amino-2-naphthol, 8-acetyl-amino-2-naphthol, benoyl naphthols; pyrazolones and pyrazyl pyrazolones; hydroxy benzoflourenenones; hydroxy derivatives of phenyl naphthylamines such as 7-hydroxy-1-naphthyl-m-hydroxyphenylamine; the various N-substituted amides such as arylides, of 5, 6, 7, 8-tetrahydro-2-hydroxy-3-naphthoic acid, of 2-hydroxy-3-anthroic acid, of methyl and dimethyl salicyclic acids, of hydroxy carbazole carboxylic acids, of hydroxy benzocarbazole carboxylic acids, of hydroxy-benzoacridone carboxylic acids, of 3,7-dihydroxy-naphthalene-2,6-dicarboxylic acid, of hydroxy-dibenzofuran carboxylic acids, of hydroxy benzothiophene carboxylic acids, etc., and the arylides of acetoacetic acid, furoyl acetic acid, benzoyl acetic acid, terephthaloyl-bis-acetic acid and the like. The arylide group in the coupling component may be a simple aromatic group such as the radical of aniline or of an aniline derivative or of a naphthylamine, or it may be the radical of a heterocyclic amine, such as, e. g., of an amine of the benzothiazole series or of a diamine of the diphenylene diphenylene oxide or diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicyclic acid, resorcinol, m-phenylene diamine, the large number of naphthol-sulfonic acids, such as e. g., R acid, G acid, the Cleve's acids, J acid, gamma acid, J-acid urea and J-acid imide, H-acid and many others. Pyrazolones such as sulfonic derivatives of 1-phenyl-3-methyl pyrazolone-5 also may be used.

The invention will be more fully illustrated in conjunction with the following examples which are meant to be illustrative only and not by way of limitation. All parts are by weight unless otherwise noted.

*Example 1*

N,N' - bis -(4''-nitrophenyl) -4,4'-aminophenyl ethylene ether

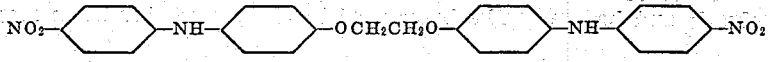

In a reaction vessel 34.8 parts potassium 4'-hydroxy-4 - nitrodiphenylamine-2-sulfonate, 6.2 parts potassium hydroxide dissolved in 100 parts of water, and 18.5 parts ethylene bis-p-toluene-sulfonate are heated under gentle reflux for six hours. After a short time, the solution becomes opaque and a solid starts separating; the solid continues to increase in amount during refluxing. The reaction mixture is chilled, and the yellow solid is collected on a filter and dried. The crude dipotassium salt of N, N'-bis-(4''-nitro-2''-sulfophenyl)-4,4'-aminophenyl ethylene glycol ether is purified by being salted with potassium chloride from a hot aqueous solution.

A slurry of 36.1 parts of this dipotassium salt in 428 parts concentrated hydrochloric acid is heated under reflux for 19 hours. During this time, the slurry changes in color from a bright lemon yellow to an orange. After refluxing, the reaction mixture is poured into 1,000 parts of water, and the undissolved solid is collected on a filter. This solid is washed free of acid on the filter with water, and is dried. This crude product is extracted with acetone, and N,N'-bis-(4''-nitrophenyl)-4,4'-aminophenyl ethylene glycol ether is reprecipitated from the acetone by addition of water. When further purified by recrystallization from dilute dioxane, it melts at 184–185° C.

*Example 2*

N,N'-bis-(4''- aminophenyl-4,4'-aminophenyl) ethylene glycol ether

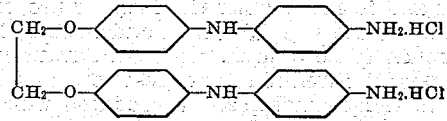

12 parts of N,N'-bis-(4''-aminophenyl-4,4'-aminophenyl) ethylene glycol ether are stirred in 136 parts of glacial acetic acid and heated to 70° C. A solution of 44.5 parts of stannous chloride dihydrate in 149 parts of concentrated hydrochloric acid is gradually added over a period of time. The reduction is allowed to proceed at a temperature of 70°–80° C. for 3½ hours at which time the solution is cooled and is treated with soda ash until it is no longer acidic to Congo Red paper. It is then made strongly basic to phenolphthalein with 20% sodium hydroxide solution. The white solid which forms is collected on a filter and is then reslurred in 500 parts of water kept strongly alkaline to phenolphthalein with sodium hydroxide. This solid is recollected on a filter, and is washed with water until free of alkali. It is then slurried in approximately 400 parts of water and hydrochloric acid is added until the slurry is acidic to Congo Red test paper. On heating, the solid dissolves, charcoal is added, and the solution is filtered. On chilling the filtrate, N,N'-bis-(4''-aminophenyl)-4,4'-aminophenyl ethylene ether dihydrochloride crystallizes out. It is collected on a filter and dried in a dessicator. It is purified by recrystallization from dilute hydrochloric acid.

*Example 3*

A slurry of 5 parts of N,-N'-bis-(4''-aminophenyl-4,4'-aminophenyl) ethylene glycol ether dihydrochloride as obtained in Example 2 in 40 parts of water and 20 parts of 17% hydrochloric acid is stirred at 40° C. while a solution of 1.6 parts of sodium nitrite in 23 parts of water is slowly added. After stirring for 10 minutes, 10 parts of sodium chloride are added and the precipitate is filtered off. The residue is reslurried in 80 parts of fresh water, is made acidic to Congo Red test paper with dilute hydrochloric acid, charcoal is added and the temperature is raised to 55° C. The resulting solution is filtered and the filtrate is chilled. On addition of 8 parts of salt, a golden yellow solid precipitates which is filtered off and is dried at low temperature. The tetrazonium chloride of N,N'-bis-(4''-aminophenyl)-4,4'-aminophenyl ethylene glycol ether is a yellow solid, soluble in water.

5.4 parts of the dry tetrazonium chloride as obtained above are well mixed with 4.9 parts of magnesium sulfate dihydrate and 2.5 parts of anhydrous sodium sulfate.

0.2 part of this mixture slurried in 2.5 parts of methanol is treated with 1.5 parts of the anilide of 2-hydroxy-3-naphthoic acid in 2.5 parts of methanol and 5 parts of pyridine whereupon a blue-black paste results. This is heated 10 minutes on a steam bath, is diluted with 200 parts of water and 20% sodium hydroxide solution is run in until a basic test on phenolphthalein paper is obtained. The precipitated dyestuff is flocculated by digestion on a steam bath, is filtered off, the residue being washed with hot water, then with dilute hydrochloric acid and finally with hot water.

After drying blue-black, water-insoluble pigment is obtained which has the following formula:

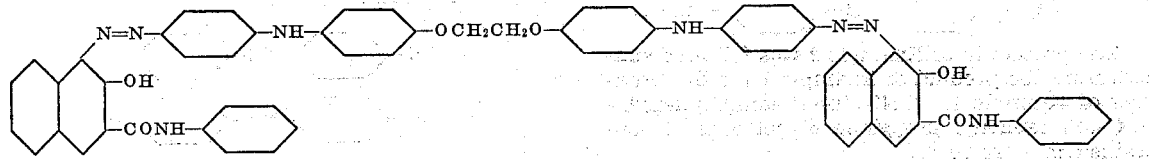

When in the above preparation, an equivalent weight of beta naphthol is substituted for the anilide of 2-hydroxy-3-naphthoic acid, a deep blue-black water-insoluble pigment is formed which has the following formula:

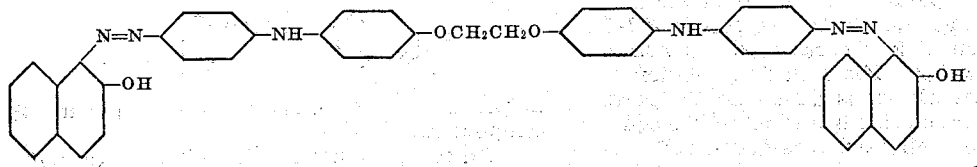

*Example 4*

A printing paste is prepared by dissolving 2 parts of the blended mixture of the tetrazonium chloride as made in Example 3 in 25 parts of water and adding thereto 73 parts of a suitable carbohydrate thickener.

Cotton piece goods are wetted in a warm ½% soap solution, are rinsed, passed between squeeze rolls and impregnated with the coupling component by passing through a warm solution of 5.0 parts of the anilide of 2-hydroxy-3-naphthoic acid, 5 parts of methanol, 20 parts of 20% sodium hydroxide, and 470 parts of water. After passing between squeeze rolls, the fabric is dried.

A part of the above prepared print paste is printed from an engraved copper roll upon this prepared cloth. The print is skyed and is dried at 65 C. It is then cleared at 70° C. in an alkaline bath (3% soda ash and 2% sodium hydroxide), is treated at 65 C. in a ½% soap solution, rinsed and dried.

The pattern is printed a bright blue of greenish shade.

The substitution of the beta-naphthylamide of 2-hydroxy-3-naphthoic acid for the anilide in the above alkaline grounding liquor produces an impregnated fabric which when printed upon by the remaining portion of the printing paste and when finished by a similar procedure produces a considerably deeper shade of blue.

*Example 5*

2.5 parts of the dihydrochloride of N,N'-bis-(4''-aminophenyl)-4,4'-aminophenyl ethylene glycol ether as prepared in Example 2, stirred in a solution of 10 parts of 17% hydrochloric acid and 10 parts of water at 30 C., are treated with 1.5 parts of sodium nitrite in 20 parts of water. The resulting solution is clarified and the filtrate is diluted to 250 parts by volume with water. 20% sodium acetate solution is run in until the solution is basic to Congo Red paper.

5.0 parts of a cotton fabric previously impregnated in an alkaline grounding liquor of the anilide of 2-hydroxy-3-naphthoic acid are stirred in the buffered bath of the N-nitroso derivative of the tetrazonium chloride until full color development is attained. The dyed cloth is divided into two parts. Part 1 is rinsed in cold water, is treated in a ½% soap solution at 65° C., is rinsed in fresh water and is dried. It is heavily dyed a deep maroon color. Part II of the dyed cloth is cleared at 90° C. in an alkaline bath (5% soda ash and ½% sodium sulfide), is treated at 65° C. in a ½% soap solution, rinsed and dried. It is levelly dyed a bright blue.

*Example 6*

The dry mixture of the tetrazonium chloride prepared as described in Example 3 is used to produce developed dyeings on cotton fabric by the following procedure:

One-half part of the dry mixture of the tetrazonium chloride is dissolved in 200 parts of water and 4 parts of 20% sodium acetate solution are added.

Cotton piece goods are separately impregnated with ice-coupling components by the procedure described in Example 4.

5 parts of the cotton piece goods so prepared are dyed in separate buffered tetrazo baths of the above composition until color development is complete. The dyeings are treated at 90 C. in an alkaline clearing bath (3% soda ash and 2% sodium hydroxide), then treated at 65° C. in a ½% soap solution, finally rinsed and dried. Some of the colors produced according to the particular ice-color coupling component taken in the alkaline grounding bath are listed below:

| Ice-color coupling component | Color |
| --- | --- |
| 2-hydroxy-3-naphthoic acid anilide | Strong blue. |
| 2-hydroxy-3-naphthoic acid (2'methyl anilide) | Reddish blue. |
| Bis-(acetoacetic)-o-tolidide | Yellow-brown. |
| 2-hydroxy-3-naphthoic acid (2'-methyl-4'-chloro-anilide) | Greenish blue. |
| 2-hydroxy-3-naphthoic acid (2'-naphthylamide) | Dark blue. |
| 2-hydroxy anthracene-3-carboxylic acid (2'-methyl-anilide) | Bluish green. |
| 2-hydroxy-3-naphthoic acid (2'-ethoxy anilide) | Reddish blue. |
| 2-hydroxycarbazole-3-carboxylic acid (2'-methyl-anilide) | Brown. |

Example 7

N,N'-bis-(4''-nitrophenyl) - 4,4'-aminophenyl propylene glycol ether

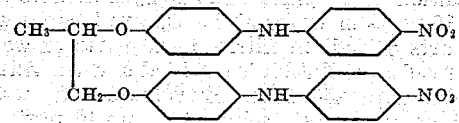

The procedure of Example 1 was followed except that 19.2 parts of propylene glycol di-p-toluene sulfonate was used instead of 18.5 parts of ethylene glycol di-p-toluene sulfonate. The N,N' - bis - 4'' - nitrophenyl - 4,4'-aminophenyl propylene glycol ether is obtained as an orange-yellow solid.

Example 8

N,N' - bis - (4'' - aminophenyl) - 4,4' - aminophenyl propylene glycol ether

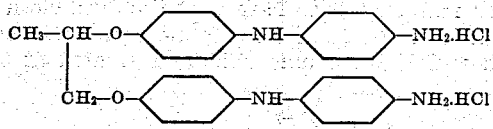

The procedure of Example 2 was followed substituting the product of Example 7 for the product of Example 1. N,N'-bis-(4''-aminophenyl)-4,4'-aminophenyl propylene glycol ether is obtained in pure form.

Example 9

1.3 parts of the dihydrochloride of N,N'-bis-(4''-aminophenyl)-4,4'-aminophenyl propylene glycol ether as prepared in Example 8 are stirred in a solution of 5 parts of 17% hydrochloric acid and 5 parts of water at 15° C. To this is added slowly a solution of 0.42 part of sodium nitrite in 5 parts of water. The resulting solution is clarified and the filtrate is diluted to 400 parts by volume. This solution is divided in two equal portions and to each portion is added 20% sodium acetate solution until the solution is no longer acid to Congo Red test paper.

Cotton piece goods are separately impregnated in alkaline grounding baths by the procedure described in Example 4 with the anilide of 2-hydroxy-3-naphthoic acid and with the beta-naphthylamide of 2-hydroxy-3-naphthoic acid.

5 parts of the impregnated fabrics are separately dyed in the buffered diazo baths prepared as described above. When color development is complete the goods are finished by the procedure of Example 4. The goods are dyed strongly the following shades:

| Coupling component | Color |
| --- | --- |
| 2-hydroxy-3-naphthoic acid anilide | Reddish blue. |
| 2-hydroxy-3-naphthoic acid-beta-naphthylamide | Heavy blue. |

We claim:

1. An azo dyestuff of the general formula:

A—N=N—B—N=N—A in which A is a residue of a coupling component and B is selected from the group of glycol derivatives of the formula:

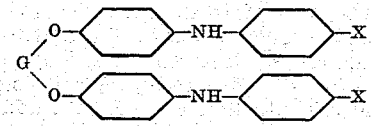

in which G is the radical of a glycol having not less than two and not more than four carbon atoms and their sulfonic acid derivatives, and in which the azo groups are attached to the points X.

2. An azo dyestuff of the general formula:

A—N=N—B'—N=N—A in which A is a residue of a coupling component and B' is selected from the group consisting of ethylene glycol derivatives of the formula:

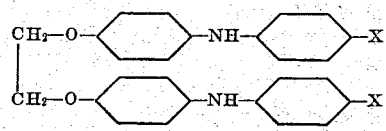

and their sulfonic acid derivatives, and in which the azo groups are attached to the points X.

3. Ice-colors having the following formula:

A'—N=N—B—N=N—A' in which A' is the residue of an ice color coupling component and B is a glycol derivative having the formula:

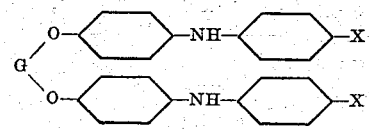

in which G is a radical of a glycol having not less than two and not more than four carbon atoms and their sulfonic acid derivatives, and in which the azo groups are attached to the points X.

4. An ice-color having the following formula:

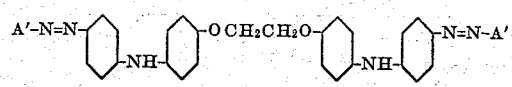

in which A' is a residue of ice-color coupling component.

5. An ice-color having the following formula:

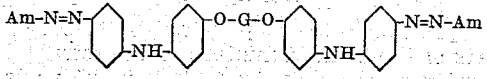

in which Am is the residue of an arylide of 2-hydroxy-3-naphthoic acid, and G is the radical of a glycol having not less than 2 and not more than 4 carbon atoms.

6. An ice-color having the following formula:

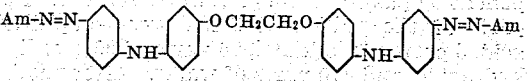

in which Am is the residue of an arylide of 2-hydroxy-3-naphthoic acid.

ROBERT P. PARKER.
JOHN J. DENTON.